United States Patent [19]
Briggs

[11] Patent Number: 5,105,633
[45] Date of Patent: Apr. 21, 1992

[54] SOLVENT RECOVERY SYSTEM WITH MEANS FOR SUPPLEMENTAL COOLING

[75] Inventor: Mark W. Briggs, Holland, Mich.

[73] Assignee: Venturedyne, Ltd., Milwaukee, Wis.

[21] Appl. No.: 646,383

[22] Filed: Jan. 28, 1991

[51] Int. Cl.[5] .............................. F25D 17/02
[52] U.S. Cl. ........................... 62/434; 62/96; 62/335
[58] Field of Search .............. 62/89, 90, 91, 92, 93, 62/94, 434, 335, 48.2, 17, 96; 34/79

[56] References Cited

U.S. PATENT DOCUMENTS

| | | | |
|---|---|---|---|
| 1,805,400 | 5/1931 | Hirsch . | |
| 2,006,992 | 7/1935 | Grothouse | 62/116 |
| 2,724,249 | 11/1955 | Gravert | 62/140 |
| 3,156,101 | 11/1964 | McGuffey | 62/434 |
| 3,173,766 | 3/1965 | Severance | 34/77 |
| 3,908,393 | 9/1975 | Eubank | 62/305 |
| 4,270,358 | 6/1981 | Husain et al. | 60/693 |
| 4,393,666 | 7/1983 | Revis | 62/506 |
| 4,959,975 | 10/1990 | Harris | 62/238.6 |

Primary Examiner—Ronald C. Capossela
Attorney, Agent, or Firm—Jansson & Shupe, Ltd.

[57] ABSTRACT

The invention is an improvement in an apparatus for condensing and recovering vaporized solvent entrained with a gas. Such apparatus has a multistage refrigeration system including a high stage circuit with a high pressure refrigerant conductor. The inventive improvement includes a solvent heat exchanger with a vessel for containing very cold condensed solvent. A portion of the high pressure refrigerant conductor is in heat-exchange relationship to such condensed solvent and transfers heat to such solvent, thereby increasing the refrigerating capacity of the system.

10 Claims, 1 Drawing Sheet

SOLVENT RECOVERY SYSTEM WITH MEANS FOR SUPPLEMENTAL COOLING

FIELD OF THE INVENTION

This invention relates generally to refrigeration systems and, more particularly, to such refrigeration systems used to recover a vaporized solvent.

BACKGROUND OF THE INVENTION

Certain industrial manufacturing processes are carried out in the presence of a volatile solvent which vaporizes as it is used. Merely by way of example, such volatile solvents are used during the manufacture of pharmaceuticals. Typically, such manufacturing processes are "ventilated" using an inert gas such as nitrogen to carry away the vaporized solvent. In some instances, it had been the practice to exhaust the gas with its entrained, vaporized solvent through a conduit such as an exhaust stack and release it to the ambient atmosphere.

More recently, environmental studies indicate (or at least strongly suggest) that vaporized solvents which are so released have an adverse effect upon the upper atmosphere. As a consequence, refrigeration systems, including those of the cascade type, have been developed to recover vaporized solvent.

One such system, which may be thought of as a separation system, uses a precooler such as a water-ethylene glycol chiller to reduce the temperature of the inert gas-vaporized solvent mixture flowing in the stack. Such temperature is reduced from a nominal ambient temperature of about 70°-80° F. to a level slightly above the freezing point of water, i.e., to about 35° F., to remove moisture from such mixture. For further temperature reduction, a plurality of evaporator heat transfer units is arranged downstream of the precooler.

Such transfer units are connected to the refrigeration system and disposed in a heat transfer relationship to the mixture. These transfer units result in the direct transfer of heat from the mixture of vaporized solvent and gas to the units. As used herein, "direct transfer" and like phrases means transfer of heat between a medium (such as the gaseous mixture) and a refrigerant without using other heat-carrying media. As a result of such heat transfer, the temperature of the mixture (including the vaporized solvent) decreases to levels well below 0° F. and such solvent is thereby condensed to a liquid. The solvent is thus separated from the gaseous mixture. Once the solvent is "stripped" from the mixture, the inert gas (now substantially free of vaporized solvent) is vented to atmosphere through the exhaust end of the stack.

Another, quite different kind of separation system is shown in U.S. Pat. No. 1,805,400 (Hirsch). Such system has two compressors in parallel or in series, depending upon the embodiment, and uses the same type of refrigerant in both compressors. The system is used to separates product such as wine, oil, paraffin, peat or cider into constituents by chilling such products. The system has a low pressure main condenser cooled by a separated cooled or frozen constituent, ice being an example of the latter. It appears that such constituent provides inadequate cooling, even when the constituent is ice, melting of which is apparently to be avoided. Therefore, additional cooling is required in the form of a high pressure auxiliary condenser which is generally in parallel with the low pressure condenser. Such high pressure condenser is cooled by water. Supplemental cooling fans are also suggested. In the only example described in any detail, the entire product, water-bearing peat sods, rather than a constituent thereof is used for cooling. That is, cooling is part of the process used to separate water from the sods rather than a result of using a post-separation constituent for cooling.

The described operation of the Hirsch system suggests that if cooling does not occur at the low pressure main condenser, the system becomes "self-impairing" if not actually inoperative for its essential purpose at least as to the separation of water from peat sods. Further, system temperatures are insufficiently low for recovering vaporized solvent. And the system is likely to be ungainly if not unworkable for solvent separation and recovery at least to the extent that ice or peat sods are used as the cooling medium.

Such earlier systems fail to recognize and utilize the full cooling potential of the recovered constituent. In particular, such systems do not evidence an appreciation of how a recovered constituent such as a very cold solvent may be used to increase refrigerant efficiency in a cascade-type solvent recovery system. And such earlier systems, the Hirsch system for example, may become functionally impaired or inoperative under certain circumstances if cooling at the low pressure main condenser does not occur.

OBJECTS OF THE INVENTION

It is an object of the invention to overcome some of the problems and shortcomings of the prior art.

Another object of the invention is to provide an improved solvent recovery system which increases refrigerant efficiency.

Still another object of the invention is to provide an improved solvent recovery system of the cascade type.

Yet another object of the invention is to provide an improved solvent recovery system using very cold condensed solvent for supplemental cooling.

Still another object of the invention is to provide an improved solvent recovery system which is fully functional even in the absence of supplemental cooling. These and other important objects will be apparent from the descriptions of this invention which follow.

SUMMARY OF THE INVENTION

The invention is an improvement in a solvent recovery apparatus of the type having a cascade refrigeration system. Such system has two refrigerant compressors and high stage and low stage circuits, each with a high pressure refrigerant conductor. A conduit or stack has a gaseous mixture comprising a vaporized solvent and an inert gas flowing through it in a downstream direction. Such apparatus also includes a pre-cooler and a plurality of transfer units, the latter connected to the refrigeration system. The pre-cooler and the transfer units are disposed in a heat transfer relationship to the gas mixture for directly extracting heat from such mixture to condense the vaporized solvent. The refrigeration system thereby "strips" the vaporized solvent from the gas mixture by reducing its temperature below the solvent condensation temperature. Once the solvent is removed, the substantially vapor-free gas is vented to atmosphere through the exhaust end of the stack.

The inventive improvement comprises a solvent heat exchanger including a vessel for containing condensed solvent. The high pressure conductor of the high stage circuit is in heat-exchange relationship to the condensed solvent for transferring heat to the solvent, thereby increasing the refrigerating capacity of such circuit. Preferably, such heat-exchange relationship is accomplished by substantially immersing a portion of the high pressure conductor in the condensed solvent.

The high stage circuit includes a condenser and a thermal expansion valve. In a highly preferred embodiment, the solvent heat exchanger is connected between the condenser and the thermal expansion valve and subcools the refrigerant flowing through the high pressure refrigerant conductor.

System operation involves a volatile solvent and very low solvent recovery temperatures. It is important that such operation does not become self-impairing by either freezing the refrigerant or boiling away the recovered solvent. It is also important that the system remain fully functional for solvent recovery in the absence of supplemental cooling.

To the end of avoiding refrigerant freezing, the selected refrigerant has a freezing temperature, preferably below about −85° F., which is below the temperature of the condensed solvent in the vessel. Solvent boiling is prevented by selecting vessel volumetric capacity and/or the rate of replacement of solvent in the vessel in view of the maximum rate at which heat is transferred from the refrigerant to the liquefied solvent.

In vapor recovery systems of the type in which the improved apparatus is used, the condensed solvent is gathered in recovery tanks, often called collection pans. In the invention, condensed solvent is routed to the vessel. As heat transfers to the condensed solvent from the high pressure refrigerant conductor in the high stage circuit, the temperature of the solvent rises. Increasing solvent temperature gradually diminishes the benefits derived from the invention.

Therefore, it is desirable to maintain system efficiency at or above some minimum level by replacement of warmed but still-liquefied solvent with colder solvent. One way to do so is to introduce condensed solvent into the vessel in "batches." When the temperature of a particular batch becomes unacceptably high, it is partially or entirely replaced with another batch. Another way to maintain system efficiency is to flow very cold condensed solvent through the vessel substantially continuously and at a rate to maintain the temperature of the solvent in the vessel at an acceptably low level.

DETAILED DESCRIPTIONS OF PREFERRED EMBODIMENTS

Figure 1:
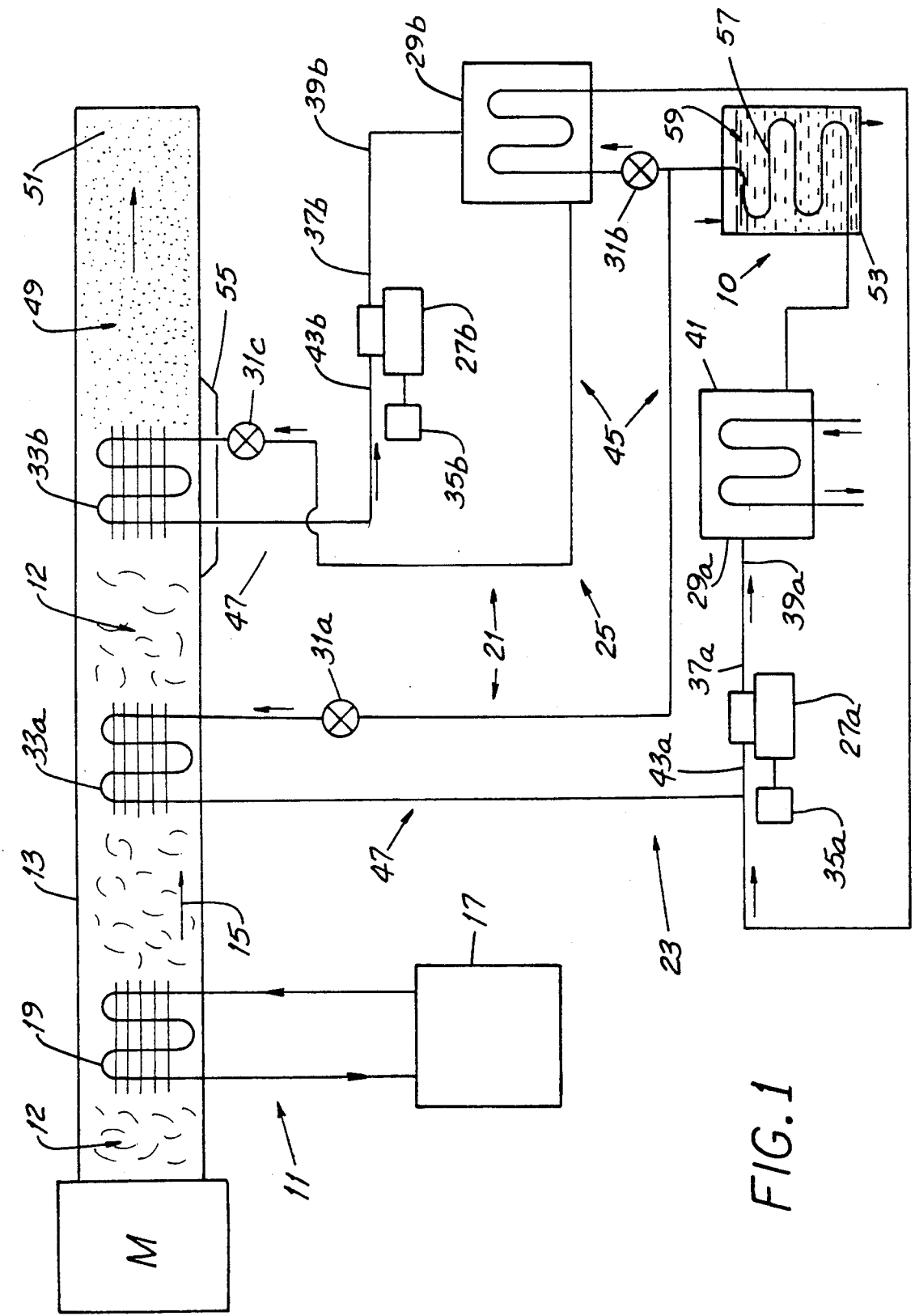
FIG. 1 is a representative schematic view of the inventive solvent heat exchanger shown in conjunction with a solvent recovery apparatus.

The first part of this detailed description provides a general overview of the solvent recovery apparatus 11. Such apparatus may be used to recover vaporized solvents (either alone or as mixed solvents) such as methylene chloride, acetone, methanol, toluene and several other highly volatile, low-condensation-temperature solvents. Following the overview, there is an explanation of how a conventional refrigeration circuit operates and how multistage refrigeration systems operate in cascade. Such explanation is followed by more detailed descriptions of preferred embodiments of the invention.

Referring to FIG. 1, the new heat exchange unit 10 is shown in conjunction with a conventional solvent recovery apparatus 11. For purposes of description, it is assumed that a manufacturing process is carried out in the location "M" and results in a gaseous mixture 12 comprising one or more vaporized solvents mixed together with a gas such as the inert gas nitrogen. As used herein, "gaseous mixture" means a gas, preferably an inert gas, mixed with one or more vaporized solvents.

The gaseous mixture 12 is conducted away from the manufacturing site M by a conduit or stack 13 which may be arranged horizontally (as shown), vertically or angularly. Irrespective of the orientation of the stack 13, direction of movement of the gaseous mixture 12 through the stack 13 is as shown by the arrow 15.

The apparatus 11 includes a water/ethylene glycol chiller system 17 connected to a pre-cooler 19, the latter being disposed in a heat transfer relationship to the gaseous mixture 12. The apparatus 11 also includes a refrigeration system 21 having a high stage circuit 23 and a low stage circuit 25 in what is known as a cascade arrangement.

Before going into greater detail, it will be helpful to explain how a refrigeration circuit operates and how such circuits may be arranged in cascade. Using a portion of FIG. 1 to illustrate such operation, a refrigeration circuit uses a compressor 27a, 27b to compress a refrigerant to a hot gaseous state. A condenser 29a, 29b cools the refrigerant to a partially or entirely liquid (but still pressurized) state and routes such cooled refrigerant through an expansion valve 31a, 31b, 31c where it expands in the absence of significant heat transfer. Such expanded refrigerant thereby becomes extremely cold.

The expanded, very cold refrigerant is then directed to an evaporative heat transfer unit 33a, 33b (and, in a cascade circuit to a cascade condenser 29b) where it performs its task of absorbing heat. The now-heated, vaporized refrigerant then returns to the compressor 27a, 27b and the cycle continues. From the foregoing, it will be understood that a refrigeration circuit is a "heat pump," absorbing heat from one location and rejecting it at another.

In a conventional two-stage cascade refrigeration system 21, the low stage circuit 25 (that in which the unit 33b operates at the lower temperature) rejects its heat to what is known as a cascade heat exchanger 29b. Such cascade heat exchanger 29b is connected for refrigerant flow in the high stage circuit 23, i.e., that in which the unit 33a operates at the higher temperature. Like the unit 33a in the high stage circuit, this cascade heat exchanger 29b represents a load to the high stage compressor 27a. And the more heat "transferred" from the low stage circuit 25 into the high stage circuit 23 by the cascade heat exchanger 29b, the greater the input energy required at the high stage compressor 27a.

More particularly, the high stage circuit 23 has a high stage compressor 27a driven by an electric motor 35a or other prime mover. Such compressor 27a compresses the refrigerant flowing in the circuit 23 and discharges it from its outlet port 37a into the conductor 39a as a hot gas. The conductor 39a passes through a water-cooled or air-cooled condenser 41 which cools and thereby partially or entirely liquefies the refrigerant. Such refrigerant, now at approximately its saturation temperature, is then directed through two thermal expansion valves 31a and 31b, respectively.

That refrigerant passing through the valve 31a is directed through a heat transfer unit 33a where the refrigerant absorbs heat by direct transfer from the gaseous mixture 12 flowing through the stack 13. That refrigerant passing through the valve 31b is directed through the cascade heat exchanger 29b where it absorbs heat from the low stage circuit 25. Refrigerant from the transfer unit 33a and from the exchanger 29b, now laden with heat, is routed to the inlet port 43a of the compressor 27a for re-compression.

The low stage circuit 25 includes a low stage compressor 27b which is also driven by an electric motor 35b. In a manner similar to that described above with respect to the high stage circuit 23, the refrigerant flowing from the compressor 27b rejects heat through the cascade heat exchanger 29b to the high stage circuit 23 and, following expansion in the valve 31c, passes through a heat transfer unit 33b where it absorbs heat by direct transfer from the gaseous mixture 12. It is to be appreciated that the portion of the refrigerant circuit 23 or 25 between the compressor outlet 37a, 37b port and an expansion valve 31a, 31b, 31c is the high pressure side 45 while that between an expansion valve 31a, 31b, 31c and the compressor inlet port 43a, 43b is the low pressure side 47.

The transfer units 33a, 33b are sequentially disposed "downstream" of the pre-cooler 19 and in a heat transfer relationship to the flowing gaseous mixture 12. Preferably, such transfer units 33a, 33b are within the stack 13 and in direct contact with such gaseous mixture 12. As the mixture 12 flows downstream in the stack 13, the pre-cooler 19 and the transfer units 33a, 33b depress the temperature of the gaseous mixture 12 to progressively lower levels. They do so, of course, by removing heat from such mixture 12. At the transfer unit 33b, the temperature of the gaseous mixture 12 is reduced to a level below the condensation temperature of the vaporized solvent. Preferably, such temperature level is several degrees below such condensation temperature for highest efficiency in solvent removal. As a result of such temperature reduction, the solvent condenses to a liquid. The apparatus 11 thereby "strips" the vapor from the gaseous mixture 12. Once the vapor is removed, the substantially vapor-free gas 49, e.g., nitrogen, is vented to atmosphere through the exhaust end 51 of the stack 13.

In one exemplary embodiment, the temperature of the gaseous mixture 12 at the pre-cooler 19 is about 35° F. and that at the transfer unit 33a is about −5° F. The temperature of the substantially vapor-free gas 49 at the transfer unit 33b, that at which vaporized solvent is condensed, is about −85° F.

The inventive improvement comprises a solvent heat exchanger 10 including a vessel 53 containing solvent 59 condensed at the transfer unit 33b and initially gathered in collection pans 55. The high pressure conductor 57 of the high stage circuit 23 is in heat-exchange relationship to the condensed solvent 59 for transferring heat to the solvent 59, thereby subcooling the refrigerant and increasing its refrigerating capacity.

Such increase in capacity may be explained by way of example. It is assumed that upon leaving the condenser the temperature of the refrigerant in the conductor 57 is about 100° F. At such temperature (and momentarily disregarding the solvent heat exchanger 10 and its effect), such refrigerant has a particular capacity to absorb heat upon entering the transfer unit 33a or the cascade heat exchanger 29b, as the case may be. With the new solvent heat exchanger 10, the temperature of the refrigerant in the conductor may be reduced to, e.g., −75° F., to −85° F., thus further improving the capacity of the refrigerant to absorb heat.

Preferably, a portion of the high pressure conductor 57 is oriented in a serpentine arrangement (coiled, zigzag or the like) and placed in the vessel 53. When so arranged, such portion is immersed in the condensed, very cold solvent 59 when such solvent 59 is introduced to the vessel 53 from the condensate collection pans 55. Using such arrangement, heat transfer from the refrigerant in the conductor 57 to the cold solvent 59 is direct, efficient and in very significant amounts.

As noted above, the high stage circuit 23 includes a condenser 41 and thermal expansion valves 31a, 31b. In a highly preferred embodiment, the solvent heat exchanger 10 is connected between such condenser 41 and thermal expansion valves 31a, 31b and subcools the refrigerant flowing through the high pressure refrigerant conductor 57. That is, such heat exchanger 10 further reduces the temperature of the refrigerant to a level significantly below the saturation temperature.

Since the operation of apparatus 11 involves a volatile solvent 57 and very low solvent recovery temperatures, it is important that such operation is not impaired by either freezing the refrigerant or boiling away the recovered solvent 57. It is also important that the apparatus 11 remain fully functional for effective solvent recovery in the absence of supplemental cooling.

To the end of avoiding refrigerant freezing, the selected refrigerant has a freezing temperature, preferably below about −85° F., which is below the temperature of the condensed solvent 59 in the vessel. In one preferred embodiment, the refrigerant in the high stage circuit 23 is R-22 while that in the low stage circuit 25 is R-13. However, these are non-limiting examples and other combinations of refrigerants may be used without departing from the invention.

Solvent boiling is prevented by selecting vessel volumetric capacity and/or the rate of replacement of solvent 59 in the vessel 53 in view of the maximum rate at which heat is transferred from the refrigerant to the liquefied solvent 59. Condensed solvent 59 is routed to the vessel 53 from the collection pans 55 and as heat transfers to the solvent 59 from the high pressure refrigerant conductor 57 in the high stage circuit 23, the temperature of the solvent 59 rises. Increasing temperature of the solvent 59 in the vessel 53 gradually diminishes the benefits derived from the invention. In fact, if solvent temperature is permitted to rise to or near its boiling temperature, the solvent 59 will again vaporize and be lost.

Therefore, it is desirable to maintain system efficiency at or above some minimum level by replacement of warmed but still-liquefied solvent 59 with colder solvent 59. One way to do so is to introduce condensed solvent 59 into the vessel 53 in "batches." When the temperature of a particular batch becomes unacceptably high (but still well below its boiling temperature), it is partially or entirely replaced with another batch. Another way to maintain system efficiency is to flow very cold condensed solvent 59 through the vessel 53 substantially continuously and at a rate to maintain the temperature of the solvent 59 in the vessel 53 at an acceptably low level.

Several aspects of the invention are noteworthy. One is that if the solvent heat exchanger 10 becomes inoperative for some reason, the solvent recovery apparatus 11 will continue to function very effectively. The only adverse result will be the lack of energy savings in the form of improved refrigerating capacity. In fact, the solvent heat exchanger 10 is temporarily inoperative at startup prior to the recovery of substantial amounts of solvent 59.

Another favorable aspect is that if the solvent recovery apparatus 11 per se becomes inoperative, the presence of the solvent heat exchanger 10 presents no additional system-related risk. Yet another such aspect is that but for the initial installation costs, the benefits of the inventive exchanger 10—in improved refrigerating capacity—are available at little or no additional cost due to the significant heat-absorbing capability of the cold condensed solvent 59.

While the principles of this invention have been described in connection with specific embodiments, it should be clearly understood that these descriptions are made only by way of example and are not intended to limit the scope of the invention.

I claim:

1. In an apparatus for condensing and thereby recovering solvent from a gaseous mixture comprised of vaporized solvent and a gas, such apparatus having a multistage refrigeration system including a high temperature circuit and a low temperature circuit, the high temperature circuit having a high pressure refrigerant conduit, the high temperature circuit and low temperature circuit being in heat exchange relationship through a cascade condenser, the improvement comprising:

a solvent heat exchanger including a vessel for containing condensed solvent therein, a portion of such high pressure conduit being in heat-exchange relationship to such condensed solvent for transferring heat to such condensed solvent thereby increasing the refrigerating capacity of the high temperature circuit.

2. The apparatus of claim 1 wherein such high temperature circuit includes a condenser and a thermal expansion valve and wherein such solvent heat exchanger is connected between such condenser and such thermal expansion valve, thereby subcooling the refrigerant flowing through the high pressure refrigerant conduit.

3. The apparatus of claim 2 wherein such condenser cools the refrigerant flowing in the refrigerant conduit to a temperature at which such refrigerant is at least partially in a liquid state.

4. The apparatus of claim 3 wherein such solvent heat exchanger subcools such refrigerant.

5. The apparatus of claim 4 wherein that portion of such high pressure conduit in heat-exchange relationship to such condensed solvent is substantially immersed in such solvent.

6. The apparatus of claim 1 wherein the temperature of the refrigerant entering such solvent heat exchanger is below about 110° F.

7. The apparatus of claim 6 wherein the refrigerant has a freezing temperature below the lowest temperature of the condensed solvent in such vessel, thereby avoiding freezing of such refrigerant.

8. The apparatus of claim 7 wherein the freezing temperature of the refrigerant is below about $-85°$ F.

9. The apparatus of claim 1 wherein condensed solvent is introduced into such vessel in batches.

10. The apparatus of claim 1 wherein condensed solvent flows through such vessel substantially continuously.

* * * * *